(12) United States Patent
Fu et al.

(10) Patent No.: US 10,249,191 B2
(45) Date of Patent: Apr. 2, 2019

(54) METHODS FOR VEHICLE MANAGEMENT AND SYSTEMS FOR TRAFFIC MANAGEMENT (71) Applicant: FORD GLOBAL TECHNOLOGIES, LLC, Dearborn, MI (US)

(72) Inventors: Shibao Fu, Jiangsu (CN); Baogang Kang, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/464,630

(22) Filed: Mar. 21, 2017

(65) Prior Publication Data
US 2017/0278393 A1  Sep. 28, 2017

(30) Foreign Application Priority Data
Mar. 22, 2016 (CN) .......................... 2016 1 0165290

(51) Int. Cl.
G08G 1/00 (2006.01)
G08G 1/0967 (2006.01)
H04W 12/08 (2009.01)
H04L 29/06 (2006.01)
G06F 21/34 (2013.01)
G08G 1/0968 (2006.01)
(Continued)

(52) U.S. Cl.
CPC ....... *G08G 1/096791* (2013.01); *G06F 21/34* (2013.01); *G08G 1/09675* (2013.01); *G08G 1/096716* (2013.01); *G08G 1/096827* (2013.01); *G08G 1/096844* (2013.01); *G08G 1/20* (2013.01); *H04L 63/0853* (2013.01); *H04W 4/46* (2018.02); *H04W 12/08* (2013.01); *H04L 63/10* (2013.01); *H04W 12/06* (2013.01)

(58) Field of Classification Search
None
See application file for complete search history.

(56) References Cited

U.S. PATENT DOCUMENTS

| 4,477,874 A | 10/1984 | Ikuta et al. |
| 6,572,015 B1 | 6/2003 | Norton |
| 7,142,696 B1 | 11/2006 | Engelsberg et al. |
(Continued)

FOREIGN PATENT DOCUMENTS

WO    2011037554 A2    3/2011

OTHER PUBLICATIONS

A Distributed Traffic Navigation System Using Vehicular Communication; Guha, R.K. and Wai Chen; Oct. 28-30, 2009.
(Continued)

*Primary Examiner* — Adolf Dsouza
(74) *Attorney, Agent, or Firm* — Brooks Kushman P.C.; Gregory P. Brown (57) ABSTRACT A vehicle management method includes allowing a start of a corresponding vehicle when one of a plurality of unique identified removable cards (UIRC) is connected to one of a plurality of vehicles, and matches the corresponding vehicle, and connecting a plurality of started vehicles, via each of the unique identified removable cards, to enable communication among the plurality of started vehicles such that each of the plurality of started vehicles outside a coverage of a vehicle management center is capable of directly obtaining traffic information from nearby vehicles of the plurality of started vehicles.

20 Claims, 4 Drawing Sheets (51) Int. Cl.
*H04W 4/46* (2018.01)
*H04W 12/06* (2009.01)

(56) References Cited

U.S. PATENT DOCUMENTS

| | | | |
|---|---|---|---|
| 7,181,409 B1 * | 2/2007 | Murakami | B60L 11/1816 |
| | | | 705/5 |
| 8,620,515 B2 | 12/2013 | Kwak | |
| 8,805,599 B2 | 8/2014 | Hibbert | |
| 2004/0073361 A1 * | 4/2004 | Tzamaloukas | G01C 21/3691 |
| | | | 701/414 |
| 2012/0253607 A1 | 10/2012 | Choi | |
| 2014/0046585 A1 | 2/2014 | Morris, IV et al. | |

OTHER PUBLICATIONS

Optimal Vehicle Routing with Real-Time Traffic Information; Seongmoon Kim, Mark E. Lewis; Chelsea C. White III; Sep. 14, 2004.
Click & Drive: Your Hire Car at the Railway Station.

* cited by examiner

METHODS FOR VEHICLE MANAGEMENT AND SYSTEMS FOR TRAFFIC MANAGEMENT

RELATED APPLICATION

This application claims the benefit of Chinese Patent Application No.: CN 201610165290.4 filed on Mar. 22, 2016, the entire contents thereof being incorporated herein by reference.

TECHNICAL FIELD

The present disclosure relates to methods for vehicle management and systems for traffic management.

BACKGROUND

U.S. patent US20140046585 discloses a route scheduling system for vehicles, or a fleet of vehicles. The route scheduling system includes an in-vehicle device (e.g., navigation device, computing device), a management device, and a vehicle management system connected with internet. The management device can access the vehicle management system to dispatch vehicles and drivers, perform other fleet management functions, and be used by the dispatchers, administrators or other users. The vehicle management system can be implemented by servers. The routing module of the vehicle management system selects a route for the vehicles that accounts for factors including cost impact, distance, and energy use (e.g., terrain or elevation, vehicle performance characteristics, driver characteristic, road condition, traffic, speed limits, traffic information and weather condition). The additional inputs can be used for recalculation, and changes in route selection, which may include a variety of inputs, such as adjustment, traffic conditions, and customer needs.

However, the vehicle management system does not include real-time measurement of vehicle flows, accidents, and other traffic condition. Furthermore, the in-vehicle devices cannot be connected directly for communication.

SUMMARY

To at least solve some issues of the current technologies, the present disclosure provides methods for vehicle management and systems for traffic management.

According to one aspect of the disclosure, a method for vehicle management is provided. The method comprises, in response to connecting one of a plurality of unique identified removable cards (UIRC) to one of a plurality of vehicles and matching a corresponding vehicle to the one of the plurality of unique identifier removable cards, allowing a start of the corresponding vehicle such that the corresponding vehicle after the start is one of a plurality of started vehicles; and connecting the plurality of started vehicles, via the unique identified removable cards, to enable communication among each of a driver of the started vehicles.

Preferably, the plurality of started vehicles includes a first vehicle and a second vehicle, and the first vehicle matches a first unique identified removable card from the plurality of unique identifiable removable cards and the second vehicle matches a second unique identified removable card from the plurality of unique identifiable removable cards.

Preferably, the real-time communication among each of the drivers includes transmitting first data to the second unique identified removable card, via the first unique identified removable card, and transmitting second data to the first unique identified removable card via the second unique identified removable card.

Preferably, the first data includes traffic information of a route of the first vehicle, and the second data includes traffic information of a route of the second vehicle.

Preferably, allowing the start of the corresponding vehicle when one of a plurality of unique identified removable cards is connected to one of a plurality of vehicles and matching the corresponding vehicle further includes allowing a start of the first vehicle and allowing a driver to access an in-vehicle navigation system of the first vehicle when the unique identified removable card is connected to the in-vehicle navigation system of the first vehicle.

Preferably, the vehicle management method further comprises, in response to the first unique identified removable card being connected to an in-vehicle navigation system of the second vehicle, disallowing a start of the second vehicle and disallowing a driver access to the in-vehicle navigation system of the second vehicle.

Preferably, the vehicle management method further comprises communicating the plurality of started vehicle with a vehicle management center via the plurality of unique identified removable card.

Preferably, the vehicle management method further comprises reporting real-time, traffic information to the vehicle management center from the plurality of started vehicles via the in-vehicle navigation systems, and providing and displaying a plurality of best routes, alternative routes, and/or traffic information by the vehicle management center to the corresponding vehicle according to the traffic information on a route, a plurality of start points, and a destination of each of the started vehicles.

Preferably, the traffic information includes one or more of a traffic flow, an accident, and traffic condition.

According to another aspect of the disclosure, a traffic management system for vehicle management is provided. The traffic management system comprises a plurality of vehicles, and a plurality of unique identified removable cards capable of being connected to the plurality of the vehicles. The traffic management system is configured to, when one of the plurality of unique identified removable cards is connected to a corresponding vehicle of a plurality of vehicles and matches the corresponding vehicle, allow a start the corresponding vehicle such that the plurality of vehicles is a plurality of started vehicles; and enable communication among a driver of the corresponding vehicle, via connection of corresponding unique identified removable cards, to the plurality of started vehicles.

Preferably, the plurality of started vehicles includes a first vehicle and a second vehicle, and the first vehicle matches a first unique identified removable card and the second vehicle matches a second unique identified removable card.

Preferably, the first unique identified removable card is configured to transmit first data to the second unique identified removable card, and the second unique identified removable card is configured to transmit second data to the first unique identified removable card.

Preferably, the first data includes traffic information of a route of the first vehicle, and the second data includes traffic information of a route of the second vehicle.

Preferably, the traffic management system for vehicles further includes an in-vehicle navigation system configured to receive identification information from one of the unique identified removable cards when the one of the unique identified removable cards is connected with the in-vehicle navigation system.

Preferably, the traffic management system for vehicles further includes a remote vehicle management center configured to receive information from the in-vehicle navigation system, and confirm if a vehicle matches the one of the unique identified removable cards based on the received identification information. In response to confirming that the vehicle matches with the one of the unique identified removable cards, the remote vehicle management center is configured to issue a matching confirmation of the match between the vehicle and the one of the unique identified removable cards. The in-vehicle navigation system is further configured to allow a start the vehicle, and a driver access to the in-vehicle navigation system based on the issued matching confirmation.

Preferably, the in-vehicle navigation system is further configured to disallow a start of the vehicle, and the driver access to the in-vehicle navigation system when the matching confirmation is not received.

Preferably, the in-vehicle navigation system is further configured to provide communication among the plurality of started vehicles and the vehicle management center via the unique identified removable cards.

Preferably, the plurality of started vehicles are configured to report real time traffic information to the vehicle management center via in-vehicle navigation system. The vehicle management center is configured to provide and display the best routes, alternatives, and/or traffic information to each one of the plurality of started vehicles based on the traffic information of each of the best routes, a start point, and a destination of each of the plurality of started vehicles.

Preferably, the traffic information includes one or more of a traffic flow, an accident, and a road condition.

The method for vehicle management and the traffic management system for vehicles of the present disclosure can achieve communication between vehicles, and, thus, a vehicle outside of a coverage of the vehicle management center can obtain useful traffic information from the vehicle management center via a nearby vehicle, or obtain the traffic information directly from nearby vehicles. Additionally, real-time traffic information can be obtained from the vehicles running on each route, thus enabling drivers to avoid routes that have a heavy traffic flow, traffic accident, and/or bad road conditions.

DETAILED DESCRIPTION

As referenced in the figures, the same reference numerals may be used herein to refer to the same or similar elements, and components, or their similar modifications and alternatives. These parameters and components are included as examples, and are not meant to be limiting. The drawings referenced herein are schematic, and associated views thereof are not necessarily drawn to scale Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures may be combined with features illustrated in one or more other figures to produce embodiments that are not explicitly illustrated, or described. The combinations of features illustrated provide representative embodiments for typical applications. Various combinations and modifications of the features consistent with the teachings of this disclosure, however, could be desired for particular applications or implementations.

Example embodiments will be more clearly understood from the following description taken in conjunction with the accompanying drawings. The accompanying drawings represent non-limiting, example embodiments as described herein.

Figure 1:
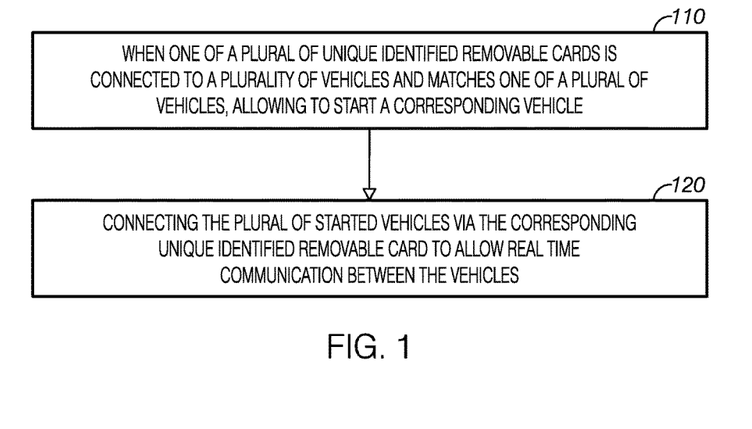
FIG. 1 is a high level flow chart of a method for vehicle management according to one embodiment of the present disclosure.

FIG. 1 is a flow chart of a method for vehicle management according to one embodiment of the present disclosure. Referring to FIG. 1, at 110, the method includes, in response to one of a plurality of unique identified removable cards ((UIRCs) (e.g., 304, 308, . . . and/or 312 in FIG. 3) connecting to a plurality of vehicles, and matches one of a plurality of vehicles (e.g., 302, 304, . . . , and/or 310 in FIG. 3), allowing a start of a corresponding vehicle. For example, the method allows a start of the corresponding the vehicle 302 when the corresponding vehicle 302 matches the unique identified removable card 304. At 120, the method includes connecting a plurality of started vehicles, via each of the plurality of UIRC to allow real time communication between each of the plurality of started vehicles, or, in the same way as communication between each of the plurality of started vehicle 302 and 306, the drivers, and between each of the plurality of started vehicles 306 and 310.

The method for the vehicle management system in FIG. 1 can achieve communication between the vehicles. When a vehicle is not in a range covered by a vehicle management center (e.g., vehicle A), the vehicle can communicate with other vehicles nearby via each of the UIRC corresponding to each of the vehicle nearby. Further, the vehicle may communicate with the vehicle management center, via vehicles capable of communicating with the vehicle and the vehicle management center, to obtain traffic information, and road condition in a current route and future routes that the vehicle will go.

Figure 2:
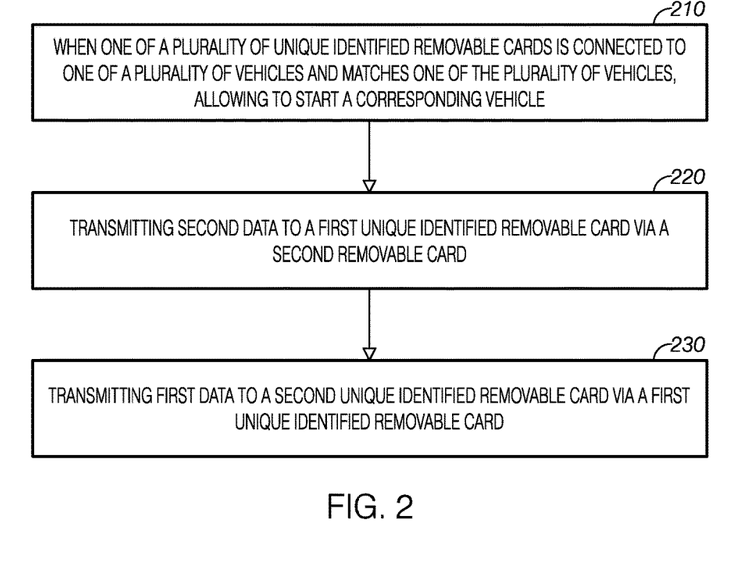
FIG. 2 is a flow chart of a method for the direct communication between vehicles according to one embodiment of the present application.

FIG. 2 is a flowchart of a method for vehicle management according to one embodiment of the present disclosure. At 210, the method includes, when one of a plurality of UIRCs (e.g., referring to 304, 308, and/or 310 in FIG. 3, or referring to FIGS. 4 and 5) is connected to one of a plurality of vehicles (e.g., referring to 302, 306 . . . and/or 310 in FIG. 3 and/or referring to FIGS. 4 and 5), and matches one of the plurality of vehicles, allowing a start of a corresponding vehicle. Specifically, a plurality of started vehicles includes at least a first vehicle 302 (or a rental vehicle A in FIG. 4 or vehicle 1 in FIG. 5), and a second vehicle 306 (or a rental vehicle C in FIG. 4 or vehicle 2 in FIG. 5). The first vehicle matches a first UIRC, and the second vehicle matches a second UIRC. When the first UIRC 304 is connected to an in-vehicle navigation system 314 in the first vehicle 302, the method includes allowing a start of the first vehicle 304, and a driver to access the in-vehicle navigation system 314 in the first vehicle. In one embodiment, when the driver (Driver 1 in FIG. 4) connects the first UIRC 304 that matches with the first vehicle 302 (referring to the rental vehicle A in FIG. 4) with the in-vehicle navigation system 314 in the first vehicle, the in-vehicle navigation system 314 may be configured to receive identification information from the UIRC 304 (e.g., from a storage module 608 in FIG. 6), and transmit the identification information to the remote vehicle management center (referring to the vehicle management center in FIG. 4). The identification information may include driver's information (e.g., a driver's identification card number, a driver license, how long the driver has driven a vehicle, whether there were accidents) and/or vehicle information (e.g., a company that vehicle belongs, a manufacturing date, year of use, and whether there were accidents). In the remote vehicle management center, the received identification information may be compared with the identification information stored in the remote vehicle management center. When the vehicle management center determines that the first vehicle 302 matches with the first UIRC and/or the first vehicle matches with the driver in the first vehicle, the remote vehicle management center issues authorization to the in-vehicle navigation system 314, that is, a matching confirmation of the first vehicle 302 with the first UIRC, and/or the first vehicle with the driver in the first vehicle. The in-vehicle navigation system releases the vehicle from the locking state according to the authorization. Thus, the driver can successfully start the vehicle with a vehicle key, and access the in-vehicle navigation system in the vehicle.

In another embodiment, when the first UIRC 304 (or a UIRC 1 in FIG. 4) is connected to the in-vehicle navigation system 316 in the second vehicle 306 (or rental vehicle A in Fig. A), the method includes disallowing a start of the second vehicle 306, and prohibits a driver to access the in-vehicle navigation system 316. When the remote vehicle management center determines that the second vehicle 306 does not match the first UIRC 304, or the second vehicle (e.g., the rental vehicle C) does not match the driver (e.g., driver 1), the remote vehicle management center does not issue authorization to the in-vehicle navigation system 316. When the in-vehicle navigation system 316 does not receive the authorization at a predetermined time, the in-vehicle navigation system maintains the vehicle in a locked state. Thus, the driver cannot start the vehicle with the key, and access the in-vehicle navigation system 316. Alternatively, the remote vehicle management center may issue a refusal of authorization to the in-vehicle navigation system when the remote vehicle management center confirms there is no match as described above. After receiving the refusal, the in-vehicle navigation system maintains the vehicle at the locked state. Meanwhile, the remote vehicle management center may monitor the vehicle, or may report to police, if necessary. Therefore, the UIRC, and the vehicle key, provide double security to prevent the vehicle from being stolen, and enhances security of the vehicle.

In another embodiment, when the vehicle (referring to vehicle 2 in FIG. 5) is not within coverage of the vehicle management center 402, the in-vehicle navigation system can be configured to obtain identification information from the UIRC, and compare the obtained identification information with the identification information stored in the in-vehicle navigation system to determine if they match. When the in-vehicle navigation system determines that the first vehicle matches the first UIRC, and the first vehicle matches the driver, the in-vehicle navigation system issues an authorization directly, that is, a matching confirmation, and release the vehicle from the locked state according to the authorization. Therefore, when the driver starts the vehicle with a vehicle key, the driver can start the vehicle successfully, and access the in-vehicle navigation system. Thus, the in-vehicle navigation system can identify the vehicle, and allow a start the vehicle, even if the vehicle is not within coverage of the vehicle management center.

At step 220, the method includes transmitting first data from the first UIRC to the second UIRC 308. The first data include traffic information of a route of the first vehicle. Specifically, the traffic information includes traffic flow, accidents, and road or traffic condition. During travel, the first vehicle 302 sends the traffic information of the route the first vehicle 302 travels, via the first UIRC 304, and enables a nearby vehicle 306 to receive the traffic information via the nearby vehicle's UIRC 308. Thus, the first vehicle 302 can transmit the first data to the second UIRC 308 via the first UIRC 304. The driver in the second vehicle may review or ignore the first data when the driver receives the first data. When the driver of the second vehicle reviews the first data, they can communicate with the driver in the first vehicle upon further confirmation. Alternatively, the in-vehicle navigation system may be configured to transmit the information directly to, or receive information from, other vehicles as necessary without instructions from the driver. In one embodiment, the in-vehicle navigation system in the first vehicle may be configured to transmit real-time traffic information to other vehicles via the first UIRC when it is determined that the vehicle is in a route having heavy traffic flow based on a vehicle speed, a distance between vehicles, etc. The second vehicle may display received information to the driver, or recommend an alternative route directly based on the received information.

Figure 6:
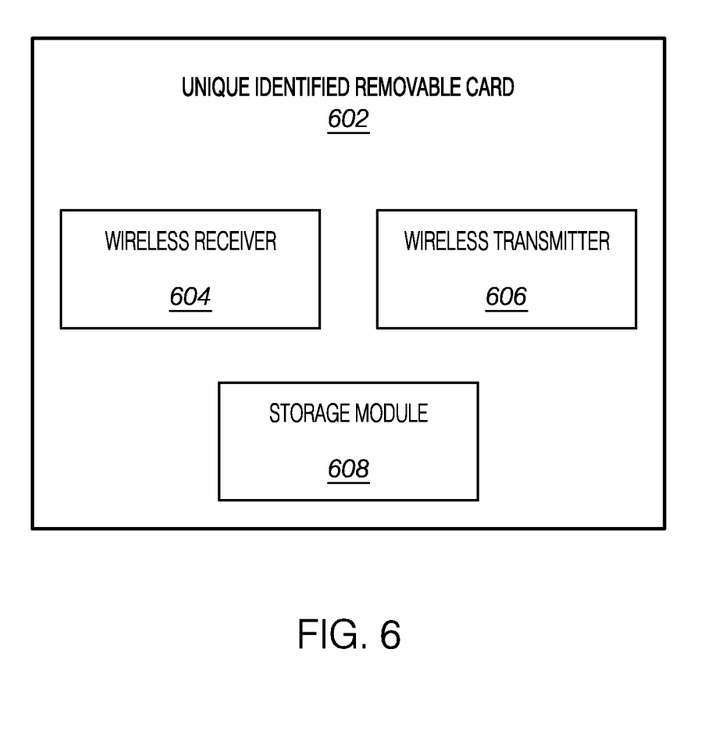
FIG. 6 is a schematic block diagram of a unique identified removable card.

Referring to FIG. 6, a wireless receiver 604 and a wireless transmitter 606 may be included in the UIRC 602 to achieve communication between the UIRCs 302 and 306, and communication between the UIRC 302 and the vehicle management center 402. Communication between UIRCs may include Institute of Electrical and Electronics Engineers IEEE standard 802.11, 802.15, 802.16, and 802.20, which is a wireless local area network WLAN (using WIFI standard), wireless personal area network WPAN (BLUETOOTH, broadband UWB), wireless metropolitan area network WMAN (IMAX), and wireless broadband mobile access WBMA. For example, the wireless receiver 604 and the wireless transmitter 606 may be included in the first UIRC and the second UIRC. When the first UIRC sends a signal via the wireless transmitter, the wireless receiver in the second UIRC receives the signal. Similarly, when the second UIRC sends a signal via the wireless transmitter, the wireless receiver in the first UIRC receives the signal. In another embodiment, when the first vehicle is in the coverage of the vehicle management center, the transmitter in the first UIRC transmits a signal, and the vehicle management center receives the signal from the receiver. A transmitting module in the vehicle management center may receive a feedback signal, and transmit the feedback signal, and the receiver in the first vehicle wireless receives the signal, thus achieving communication between the first vehicle and the vehicle management center.

At 230, the method includes transmitting the second data to the first UIRC 304 via the second UIRC 308. When the driver in the second vehicle is confirmed to check the second data, the second data is transmitted to the first UIRC 304 via the second UIRC 308. In some embodiments, the second data includes traffic information of a route of the second vehicle. Thus, the first vehicle 302 and second vehicle 306 may communicate directly, via the UIRCs, to ensure that the vehicles outside the coverage of the vehicle management center can obtain traffic information from other vehicles, or communicate with the vehicle management center.

In one embodiment, a plurality of started vehicles may directly communicate with the vehicle management center via the UIRCs. In another embodiment, a plurality of started vehicles may communicate with the vehicle management center via the in-vehicle navigation system. Specifically, the plurality of started vehicles report real-time traffic information to the vehicle management center via the in-vehicle navigation system. The vehicle management center may provide optimized, or the best traveling routes and/or alternative routes, and traffic information to the corresponding started vehicles, and display the routes and traffic information based on the traffic information on each route, and a starting point and a destination of each of the plurality of started vehicle. The traffic information may include traffic flow, accidents, and road conditions.

Figure 3:
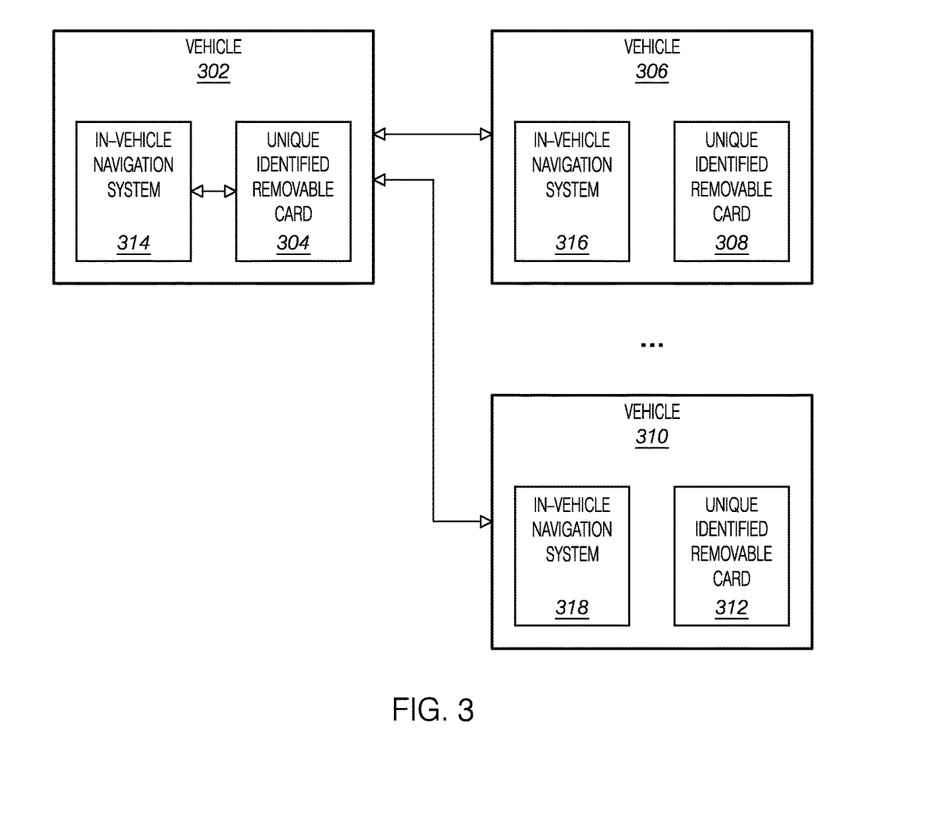
FIG. 3 is a block diagram of a traffic management system for vehicle management according to one embodiment of the present disclosure.

FIG. 3 is a block diagram of a traffic management system for vehicle management according to one embodiment of the present disclosure. The traffic management system for vehicle management includes a plurality of vehicles; a plurality of UIRCs 302, 306, and 310 connected to each of the plurality of vehicles; a traffic management center (referring to 402 in FIG. 4) configured to, in response to one of a plurality of UIRCs being connected to one of a plurality of vehicles and matching a corresponding vehicle, allow a start of the corresponding vehicle, and connect a plurality of started vehicles 302, 306, and 310 via the corresponding UIRCs to enable the real time communication between the drivers.

Below is a description of communication between the vehicles. The first UIRC 304 is configured to transmit the first data to the second UIRC 308. The second UIRC 308 is configured to transmit the second data to the first UIRC 304. In some embodiments, during driving, a started vehicle 302 transmits traffic information on its route, via the first UIRC 304, such that the nearby vehicles 306 and 310 are able to receive the traffic information via the corresponding UIRCs 308 and 312. Thus, the started vehicle 302 may transmit the first data to the second UIRC 308 of the started vehicle 306 via the first UIRC. When a driver of the started vehicle 306 receives the first data, the driver can check the first data, or ignore the first data. When the driver of the vehicle 306 checks the first data, the driver may communicate with the driver in vehicle 302 upon confirmation. Similarly, the UIRC 308 of the started vehicle 306 may transmit the second data to the UIRC 304 of the vehicle 302. A plurality of vehicles includes first and second vehicles, wherein, the first vehicle matches the first UIRC and second vehicle matches the second UIRC. In some embodiments, the first data includes the traffic information on the first vehicle's route, and the second data includes the traffic information on the second vehicle's route. The traffic information includes one or more of traffic flow, accidents, and road conditions.

FIG. 6 is a block diagram of a UIRC, schematically illustrate the components of the UIRC. The UIRC 602 may include a wireless receiver 604 and a wireless transmitter 606 to achieve communication between the UIRCs 302 and 306, and communication between UIRC 302 and the vehicle management center 402. Communication between UIRCs may include IEEE standard 802.11, 802.15, 802.16, and 802.20, which include wireless LAN (WIFI standard), WPAN (BLUETOOTH, broadband UWB), WMAN (IMAX), and wireless broadband mobile access WBMA. For example, the wireless receiver 604 and the wireless transmitter 606 may be included in the first UIRC and the second UIRC. When the first UIRC transmits a signal via the wireless transmitter, the wireless receiver in the second UIRC receives the signal. Similarly, when the second UIRC transmits a signal via the wireless transmitter, the wireless receiver in the first UIRC receives the signal. In another embodiment, when the first vehicle is in the coverage of the vehicle management center, the wireless transmitter in the first UIRC sends a signal, the vehicle management center receives the signal via a receiver. A transmitting module in the vehicle management center transmits the feedback signal, and the wireless receiver in the first vehicle receives the signal, and thus achieving communication between the first vehicle and the vehicle management center.

Figure 4:
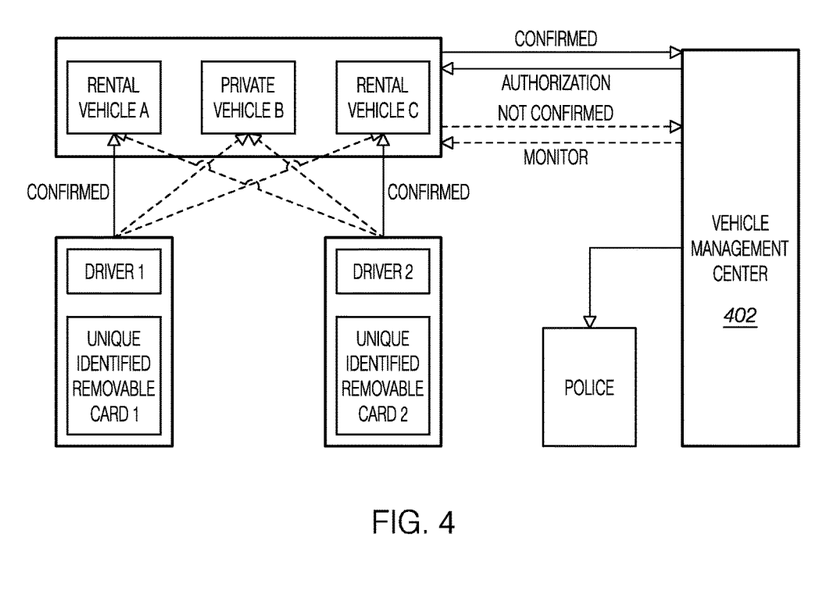
FIG. 4 is a block diagram illustrating identification of a plurality of unique identified removable cards of a traffic management system in a vehicle management center according to one embodiment of the present disclosure.

FIG. 4 is a block diagram illustrating identification of a plurality of UIRCs of a traffic management system in a traffic management center according to one embodiment of the present disclosure. The traffic management system for vehicle management includes a plurality of vehicles (e.g., rental vehicles A, B, and C); a plurality of UIRCs (e.g., UIRCs 1 and 2) connected to the plurality of vehicles; a traffic management device is configured to, when one of a plurality of UIRCs connects and matches one of a plurality of vehicles, allows a start the corresponding vehicle. The traffic management system for vehicle management further includes in-vehicle navigation systems (e.g., 314, 316, and 318 in FIG. 3) configured to obtain identification information from the UIRC when the UIRC in connected to the in-vehicle navigation system. For example, referring to FIG. 6, the traffic management system obtains identification information from the storage module 608 in the UIRC 602. The remote vehicle management center is configured to obtain the identification information from the in-vehicle navigation system, and determine if the identification information matches the UIRC. When the vehicle matches with the UIRC (i.e., confirmation signal in FIG. 4), the remote vehicle management center issues matching confirmation, and the in-vehicle navigation system allows the start of the vehicle, and the driver to access the in-vehicle navigation system according to the received matching confirmation information (authorization signal in FIG. 4). Otherwise, the in-vehicle navigation system is further configured to disallow the driver to start the vehicle, and access the in-vehicle navigation system if no confirmation is received in a predetermined time (such as time set in a range of 5-60 seconds, for example, 5, 8, 10, or 30 seconds). As such, the vehicle management center 402 can perform real time monitoring to any abnormal connection or the vehicle usage and, report to the police, as necessary.

Figure 5:
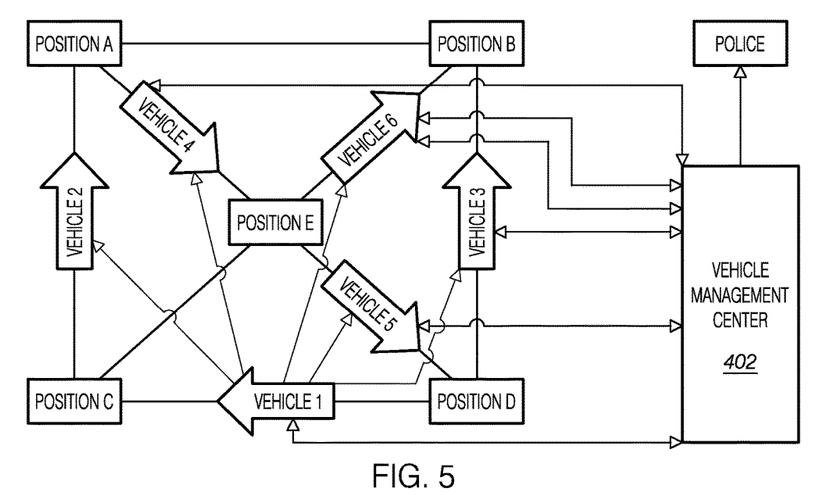
FIG. 5 is block diagram illustrating communication between vehicles and vehicles and between the vehicles and a vehicle management center of a traffic management system for vehicle management according to one embodiment.

FIG. 5 is a schematic diagram of communication among and between the vehicles, and a vehicle management center in a traffic management system for vehicle management. The in-vehicle navigation systems in the vehicles are configured to connect a plurality of the started vehicles (e.g., vehicles 1, 2, 3, 4, 5, and 6) with the vehicle management center 402 via the UIRCs as described above. The plurality of started vehicles are configured to report real-time traffic information to the vehicle management center via the corresponding in-vehicle navigation systems. The vehicle management center 402 is configured to provide and display optimized, or the best routes, and/or alternatives routes and traffic and road conditions to the corresponding started vehicles based on the traffic information on each route, and a starting point and a destination of each started vehicle. The traffic information may include traffic flow, accidents, and/or road conditions.

FIG. 5 illustrates communication between vehicles. The vehicle 1 traveling between location C and B may transmit a signal via the UIRC. The vehicles, (e.g., vehicles 2, 3, 4, 5, and 6) during travel, may obtain the signal. The drivers can choose whether to check the information from the vehicle 1, and whether to communicate with the vehicle 1 based on their needs. When the vehicle 2, between location A and B, is away from a range covered by the vehicle management center 402 (that is, the vehicles 2 cannot communicate with the vehicle management center via the in-vehicle navigation systems), the driver in the vehicle 2 may choose to receive the signal from the vehicle 1, and communicate with the vehicle 1. Alternatively, the vehicle 2 may communicate with the vehicle 4 to obtain necessary traffic information on the route that the vehicle 2 will drive through from the vehicle 4. In addition, the vehicle 2 may also communicate with the vehicle management center 402 via vehicles 4, or vehicle 1. For example, the vehicle 2 via its UIRC may communicate with the UIRC of the vehicle 4 that is covered by the vehicle management center 402. Since the UIRC of the vehicle 4 is in the coverage of the vehicle management center 402, the UIRC of the vehicle 4 may communicate with the vehicle management center 402 via the in-vehicle navigation system, or communicate with the vehicle management center directly. Accordingly, the UIRC in the vehicle 2 may communicate indirectly with the vehicle management center, via the UIRC and/or in-vehicle navigation system of the vehicle 4, and thus may obtain extra information from the vehicle management center, or transmit real-time traffic information obtained from the vehicle 2 to the vehicle management center. In one embodiment, indirect communications between the vehicle 2 and the vehicle management center are: the UIRC in vehicle 2 to the UIRC in vehicle 4 to the vehicle management center to the UIRC in the vehicle 4 to the UIRC in vehicle 2. In another embodiment, indirect communication between the vehicle 2 and the vehicle management center is: the UIRC in vehicle 2 to the UIRC in vehicle 4 to the in-vehicle navigation system in vehicle 4 to the vehicle management center to the in-vehicle navigation system in vehicle 4 to the UIRC in vehicle 4 to the UIRC in vehicle 2.

The systems and methods of the present disclosure enable the communication between the vehicle outside the coverage of the management center and the nearby vehicle via the UIRC or communication between the vehicle and the management center via the nearby vehicle. It is possible to know the traffic and road information in real time. Further, it is possible to select the routes so as to avoid the route with heavy traffic, slow vehicle speed and accidents. In this way, the driver can arrive at the destination easily. Furthermore, the UIRC can be identified by the in-vehicle navigation system or the vehicle management center to prevent the vehicle being stolen by matching the driver information with the vehicle information.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle management method, comprising:
   in response to each one of a plurality of unique identified removable cards being connected to and matching a corresponding vehicle of a plurality of vehicles, allowing a start of the corresponding vehicle such that the plurality of vehicles is a plurality of started vehicles; and connecting the plurality of started vehicles, via the unique identified removable cards, to enable communication between each of the plurality of vehicles.

2. The method for vehicle management of claim 1, wherein the plurality of vehicles includes a first vehicle and a second vehicle, wherein the first vehicle matches a first unique identified removable card, and the second vehicle matches a second unique identified removable card.

3. The method for vehicle management of claim 2, wherein communication among the first and second vehicles includes:
   transmitting first data to the second unique identified removable card via the first unique identified removable card, and
   transmitting second data to the first unique identified removable card via the second unique identified removable card.

4. The method for vehicle management of claim 3, wherein the first data includes traffic information of a route of the first vehicle, and the second data includes traffic information of a route of the second vehicle.

5. The method for vehicle management of claim 2, wherein allowing the start of the corresponding vehicle includes:
   in response to the first unique identified removable card being connected to an in-vehicle navigation system of the first vehicle, allowing a start of the first vehicle and a driver to access the in-vehicle navigation system of the first vehicle.

6. The method for vehicle management of claim 5, further comprising, in response to the first unique identified removable card being connected to the in-vehicle navigation system of the second vehicle, disallowing a start the second vehicle and the driver to access the in-vehicle navigation system of the second vehicle.

7. The method for vehicle management of claim 1 further comprising communicating between the plurality of started vehicle and a vehicle management center via the unique identified removable cards.

8. The method for vehicle management of claim 7, further comprising:
reporting current traffic information to the vehicle management center by the plurality of started vehicles via in-vehicle navigation systems of the respective started vehicles; and
providing and displaying one of optimized routes, alternative routes and traffic information to the corresponding vehicle within the plurality of started vehicles, by the vehicle management center, according to the current traffic information, and a starting point and a destination of each of the plurality of started vehicles.

9. The method for vehicle management of claim 8, wherein the traffic information includes one of a traffic flow, an accident, and a traffic condition.

10. A traffic management system, comprising:
a plurality of vehicles; and
a plurality of unique identified removable cards, each card connects with a corresponding vehicle of the plurality of vehicles,
wherein the traffic management system, in response to one of the plurality of unique identified removable cards being connected to and matching with the corresponding vehicle, allows a start of the corresponding vehicle, and connects a plurality of started vehicles, via each of the plurality of the unique identified removable cards, to enable communication among each of the plurality of started vehicles.

11. The traffic management system of claim 10, wherein the plurality of started vehicles includes a first vehicle and a second vehicle, wherein the first vehicle matches a first unique identified removable card of the plurality of unique identified removable cards, and the second vehicle matches a second unique identified removable card of the plurality of unique identified removable cards.

12. The traffic management system of claim 11, wherein the first unique identified removable card transmits first data to the second unique identified removable card, and the second unique identified removable card transmits second data to the first unique identified removable card.

13. The traffic management system of claim 12, wherein the first data includes traffic information of a first vehicle route, and the second data include traffic information of a second vehicle route.

14. The traffic management system of claim 10, further comprising an in-vehicle navigation system that obtains identification information from one of the plurality of unique identified removable cards when the one of the plurality of unique identified removable cards is connected to the in-vehicle navigation system.

15. The traffic management system of claim 14, further comprising:
a remote vehicle management system that obtains identification information from the in-vehicle navigation system, determines whether the corresponding vehicle matches the one of the plurality of unique identified removable cards according to the identification information, and sends a matching confirmation responsive to the corresponding vehicle matching the one of the plurality of unique identified removable cards, and
wherein the in-vehicle navigation system allows a start of the corresponding vehicle, and a driver to access the in-vehicle navigation system of the corresponding vehicle according to the matching confirmation as received.

16. The traffic management system of claim 15, wherein the in-vehicle navigation system disallows a start of the corresponding vehicle and disallow a driver to access the in-vehicle navigation system of the corresponding vehicle if the matching confirmation is not received.

17. The traffic management system of claim 14, wherein the in-vehicle navigation system connects the plurality of started vehicles with a vehicle management center via the plurality of unique identified removable cards.

18. The traffic management system of claim 17, wherein the plurality of started vehicles reports current traffic information in real time to the vehicle management center via corresponding in-vehicle navigation systems; and the vehicle management center provides and displays one of optimized routes or alternative routes, and road conditions to the corresponding vehicle according to the traffic information from each of the optimized or alternative routes, a starting point and a destination of each of the plurality of started vehicles.

19. The traffic management system of claim 18, wherein the traffic information includes one of a traffic flow, an accident and a traffic condition.

20. A vehicle management system comprising:
a plurality of vehicles, each having an associated unique identified removable card and including a respective in-vehicle navigation system; and
a remote vehicle management center that
obtains identification information from the respective in-vehicle navigation systems,
determines whether each vehicle matches the associated unique identified removable card according to identification information stored on the associated identified removable card; and
sends a matching confirmation to each vehicle that matches with the associated unique identified removable card,
wherein the in-vehicle navigation system allows a start of each vehicle and a driver within each vehicle of the plurality of vehicles to access the in-vehicle navigation system of the other vehicles in the plurality of vehicles in response to receiving the matching confirmation.

* * * * *